March 23, 1948.    H. G. HAMILTON    2,438,213
GYROSCOPE ERECTION SYSTEM
Filed July 10, 1945

INVENTOR
HUGH G. HAMILTON
BY Darby & Darby.
ATTORNEY

Patented Mar. 23, 1948

2,438,213

UNITED STATES PATENT OFFICE 2,438,213

GYROSCOPE ERECTION SYSTEM

Hugh G. Hamilton, Baldwin, N. Y., assignor to Eastern Air Devices, Inc., Brooklyn, N. Y., a corporation of New York Application July 10, 1945, Serial No. 604,159

5 Claims. (Cl. 74—5)

This invention involves improvements in gyroscopic devices with special relation to automatically operating means for bringing the axis of the gyro-motor back to the vertical upon displacement therefrom.

The broad object of the invention is to provide as an element of gyroscopic devices a body of viscous liquid containing a bubble of gas or a liquid bubble of lesser specific gravity than the viscous liquid, which causes the gyroscope when off the vertical to return to a vertical state under the forces caused by the movement of the body of liquid as a result of the divergence of the gyroscope from a vertical position.

Other and more detailed objects of this invention will be apparent from the following description of one embodiment thereof.

This invention resides substantially in the combination, construction, arrangement and relative location of parts, all as will be described in detail below.

Figure 1:
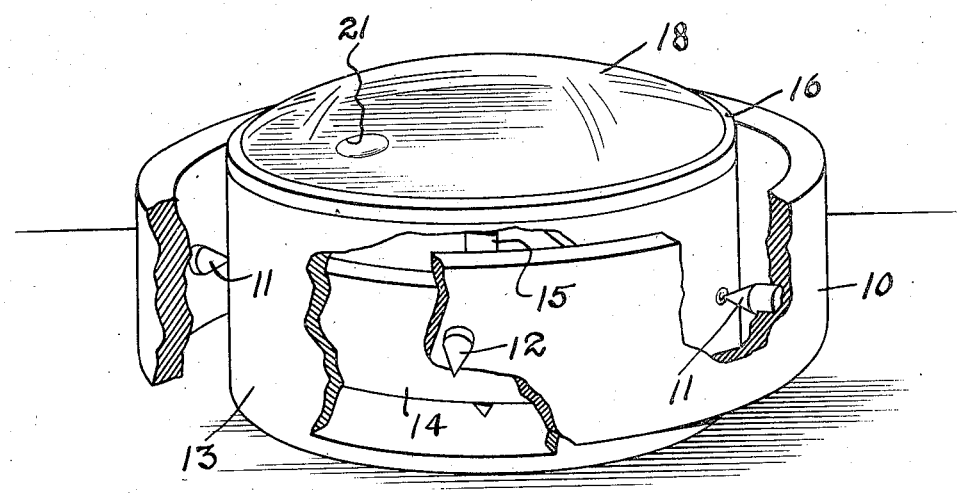
Figure 2:
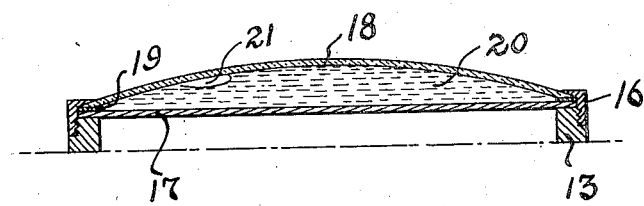

In the accompanying drawings,

Figure 1 is a perspective view with some parts broken away and some parts omitted of the essential structure of this invention; and Figure 2 is a vertical cross-sectional view through the cover of the gyro-motor housing, illustrating its formation into a chamber for the viscous liquid and the bubble.

As will be apparent to those skilled in the art from the following description of the subject matter illustrated in the attached drawings, the invention may be applied to various forms of gyroscopic instruments as now commonly employed in navigation and the like. For this reason only so much of a gyroscopic instrument is shown as is necessary to an understanding of the subject matter defined in the appended claims.

Referring to the drawings, the gimbal ring is shown at 10 and is provided with a pair of diametrically aligned external pivot members, of which one indicated by the reference numeral 12 is shown in Figure 1. Exterior pivots 12 for the gimbal ring 10 are provided for the purpose of mounting it in any suitable support, the nature and construction of which will depend somewhat upon the purposes for which a particular device is to be employed. For example, an outer casing is frequently used with devices of this type, by means of which it is mounted upon a support, and in such a casing, the gimbal ring 10 is pivotally mounted by means of the pivots 12. A second pair of diametrically aligned pivot members 11 is provided on the interior of the gimbal ring 10 and lie at an axis at right angles to the axis of the pivot pins 12. Journaled on the pivot pins 11 is the housing 13 for the gyroscope motor, which may be of any of the well known forms employed in devices of this type. Fundamentally such a motor includes a rotatable mass 14 journaled on a vertical axis 15 which is rotatably mounted in the housing 13. The mass or rotor 14 is caused to revolve at high speed by various forms of motive devices, such as air turbines, electric motors, and the like.

If a device of this type is mounted, for example, in an airplane, the vertical axis of the rotor 14 may be displaced from the true vertical under the influence of various forces inherent in the operation of the airplane or due to frictional effects in the gimbal bearing. As is well known, in order to function properly in the normal operation of such a device, it is necessary to bring the rotor axis 15 back into the true vertical after such displacement.

There are many well known forms of erection systems for accomplishing this purpose, all of which are dependent upon the generation of precessional forces arising as a result of the displacement of the vertical axis.

The subject matter of this invention is concerned with a novel structure for causing such an erection action. In the form illustrated in the drawing, the upper end of the rotor housing 13 is provided with a cover 17, which although illustrated in the drawings as a separate element, might as well be an integral part of the housing. It forms the lower wall of a chamber on top of the housing, the other wall 18 of which is curved or dished upwardly, forming a uniform curved surface about its vertical axis. The wall 18 may be detachably connected to the housing 13 by means of a threaded nut 16 and to prevent leakage a suitable gasket 19 is interposed between the wall members 17 and 18. The wall 18 may be opaque, translucent or transparent since, of course, it is not necessary to be able to observe the bubble, but if for any reason this is desirable, it can thus be made visible. The space between the wall members 17 and 18 is filled with some suitable viscous liquid 20, with the exception of a very small space which therefore forms a bubble as indicated at 21 containing a lighter liquid or a gas.

When the gyroscope is in operation and the axis of the rotor 14 is in the true vertical, it will be understood that the bubble 21 will intersect the true vertical, or in other words, the bubble will be directly above the upper pivot of the shaft 15. However, upon displacement of the rotor axis 15 from the vertical the liquid will shift to one side of the true vertical. It follows that the weight of the liquid will be on one side of the true vertical, causing the gyroscope to precess as is well understood in the art. As a result of such precession the liquid continually shifts to new positions, and specifically it travels in a spiral path of decreasing radius until the axis of the gyro-motor returns to the true vertical. If a pointer is attached to the wall 18 in the axis of the rotor 15 so as to extend upwardly, the free end thereof will travel in a spiral path of gradually decreasing radius from the point of maximum displacement back to its original position in the true vertical.

As those skilled in the art will appreciate the energy of the unbalanced forces resulting from the displacement of the vertical axis of the gyro-motor from the true vertical is gradually dissipated, causing the above movements of the viscous liquid and in overcoming the frictional effects of the gimbal bearings.

It will be readily understood from the foregoing description that the subject matter of this invention may be embodied in various known forms of gyroscopic devices, and I do not, therefore, desire to be limited except as required by the appended claims.

What is claimed is:

1. In a gyroscopic device a gimbal ring adapted to be pivotally supported, a gyroscopic motor pivotally supported in said ring, and an erection device for a gyroscope consisting of a confined body of liquid having a bubble therein.

2. In an erection system for a gyroscope, the combination comprising a rotor journaled in a housing, means for pivotally supporting said housing on two axes at right angles to each other, and an erection device consisting of a body of liquid confined on said housing and containing a bubble.

3. In a gyroscopic device, the combination comprising a housing, a rotor journaled in said housing on a vertical axis, means for supporting said housing on an axis at right angles to said rotor axis, said housing having a chamber formed on the top thereof and a body of liquid confined in said chamber and containing a bubble, whereby unbalanced forces in said liquid resulting from displacement of the rotor axis from the vertical return said rotor axis to the vertical.

4. In a device of the type described, a housing forming two compartments one above the other, a liquid substantially filling said upper compartment but containing a bubble, a gyroscope rotor journaled in said housing on a vertical axis, and means for supporting said housing on a pair of axes at right angles to each other and the axis of rotation of said gyroscope rotor, said liquid body providing means in itself for returning the rotor axis to the vertical upon displacement therefrom.

5. In the combination of claim 4, said liquid being viscous.

HUGH G. HAMILTON.

REFERENCES CITED

The following references are of record in the file of this patent:

UNITED STATES PATENTS

| Number | Name | Date |
|---|---|---|
| 2,367,465 | Kunzer | Jan. 16, 1945 |
| 2,384,838 | Kellogg | Sept. 18, 1945 |